United States Patent Office 3,002,887
Patented Oct. 3, 1961

3,002,887
METHOD OF PURIFYING A DIALYZABLE LIPID MOBILIZER CONTAINED IN BLOOD
Friedrich Wilhelm Zilliken, Springfield, Pa., assignor to American Home Products Corporation, New York, N.Y., a corporation of Delaware
No Drawing. Filed June 11, 1958, Ser. No. 741,229
7 Claims. (Cl. 167—74)

This invention relates to a method of purifying a dialyzable lipid mobilizer contained in mammalian blood which is disclosed in copending application of Seifter and Baeder, Serial No. 741,230, filed June 11, 1958, as a continuation-in-part of Serial Nos. 559,530, filed January 17, 1956, and 622,536, filed November 16, 1956.

This material has value in the regulation of fat mobilization and the controlled depletion of fat deposits in the animal organism. It may be used in animal husbandry and veterinary practice and in human therapy to mobilize adequate amounts of fat to meet the challenge of shock, trauma, surgery and chronic disease.

The fat-mobilizing potency of this product, on which its usefulness depends, is enhanced many fold by the purification process herein disclosed and claimed.

This lipid mobilizer is obtained by subjecting a mammal to non-specific stress, as by injection of cortisone, thereafter removing blood from the stressed animal, separating the plasma or serum from the whole blood, dialyzing the plasma or serum against water, and freeze-drying the dialyzate. Although the product so obtained is a potent lipid mobilizer, it contains considerable amounts of inert material.

It is an object of this invention to provide a method of selectively removing the inert material and obtaining the lipid mobilizer in a highly purified and potent form.

I have discovered that this can be accomplished by adsorbing the lipid mobilizer, hereinafter designated as L.M., from the plasma or serum dialyzate to a suitable adsorbent, dissolving the adsorbent in an organic non-solvent for the L.M., separating the undissolved L.M. as by centrifugation, and further purifying the recovered solid residue by solvent fractionation or partition chromatography or both.

Various adsorbents may be used, both soluble and insoluble. As an adsorbent soluble in organic solvents and insoluble in water, I have found benzoic acid particularly useful. Other solid, water-insoluble organic acids, such as phthalic acid, may be used. Acetone is a suitable solvent for the adsorbent and non-solvent for the L.M. Other suitable solvents for this step, which are non-solvents for L.M., are ethyl ether, chloroform, dioxane, methylethyl ketone, tetrahydrofurfurane, and the like.

Alternatively an insoluble adsorbent may be used such as cellulose powder ("Solka Floc," the Brown Co.), a diatomaceous earth product ("Hyflo Supercel," Johns-Manville), or a suitable cation exchange resin ("Dowex" 50, 200–400 mesh, Dow Chemical Co.). In the latter case, the L.M. is eluted from the adsorbent, using a gradient technique, by water or aqueous 0.3–1.0 M ammonium formate or, in the case of a diatomaceous earth or a cellulose adsorbent, by an acidified aqueous alcohol such as an aqueous solution of n-butanol and acetic acid.

For the solvent fractionation step I have found aqueous ethanol suitable, but other water-miscible solvents may be used, such as methanol, and n- and i-propanol.

For the preparation of small batches in the laboratory the first adsorption step may be dispensed with and the freeze-dried residue of the aqueous plasma dialyzate may be directly fractionated by the use of suitable water-miscible solvent-precipitants, e.g. aqueous ethanol.

To obtain a product of still higher purity, the material resulting from solvent fractionation may be chromatographed, e.g. on a cellulose column. In this way a crystalline product of high potency may be obtained.

The following examples of embodiments of my invention are intended to be illustrative only and not to limit its scope, which is defined in the appended claims.

EXAMPLE 1

Horses are fasted for 24 hours and injected intramuscularly with 11-dihydro-17-hydroxy-corticosterone-21 acetate at 5 mg./kg. of body weight. Four hours later they are bled aseptically from the jugular vein, the blood being received in 1 part 0.1 M trisodium citrate for 9 parts whole blood; the blood is stored at 5° C. for 72 hours to permit settling of the cells. The decanted plasma is dialyzed in closed sterile containers through "No-Jax" casing, previously washed with 0.5 percent phenol and sterile pyrogen-free demineralized water, into an equal volume of sterile demineralized water for 72 hours at 25° C. with constant agitation.

Fifty ml. (equivalent to 12 g. dry weight) of the dialyzate is adjusted to pH 3.5 with 2 N HCl, and 20 ml. of a 20 percent benzoic acid solution in acetone is added slowly at room temperature with agitation. The benzoic acid precipitate is stirred in the solution for about 1 hour and then filtered off. The precipitate, which includes the adsorbed L.M., is washed twice with 50 ml. water and then dissolved in 20 ml. acetone, in which the active L.M. principle is insoluble. The residue is separated by centrifugation.

Ten g. inactive material is removed in the first filtrate and 0.4 g. in the water washings. All the L.M. activity is contained in the 25 mg. acetone-insoluble precipitate. This material exhibits enhanced lipid mobilization in the rat. This material may be purified further by the methods of Examples 2 and 3.

EXAMPLE 2

Blood dialyzate obtained as described in Example 1 is freeze-dried.

Twenty-three g. of the solid residue (having an activity of 1–5 mg./kg. in the rat) is dissolved in 100 ml. water. This residue contains approximately 90–95 percent inert material consisting chiefly of blood salts. The slightly yellow solution is filtered, adjusted to pH 3.5–4.0 by adding 4 N HCl, diluted to 125 ml. and chilled to about +5° C. The pH adjustment is important for good yields and purification. Absolute ethanol is then added in successive portions to a 20 ml. aliquot of the solution and the resulting precipitate removed after each addition. Finally ether is added. Each precipitate is separately dried in a vacuum desiccator and biologically tested. The results are shown in the following Table I:

Table I

| Starting Material (Solution ≡ 3.68 g. solute) | Added Material | Final Concentration of ethanol vol. percent | Weight of Precipitate, g. | L.M. Activity (rats) |
|---|---|---|---|---|
| 20 ml. | 80 ml. EtOH | 80 | 0.290 | Inactive. |
|  | 20 ml. EtOH | 83 | 0.512 | Do. |
|  | 80 ml. EtOH | 90 | 0.620 | Do. |
|  | 200 ml. EtOH | 95 | 0.170 | Active at 25–50 γ/kg. |
|  | 600 ml. Et$_2$O |  | 1.750 | Inactive. |
| Total |  |  | 3.342 |  |

A further set of results is shown in Table II:

Table II

| Starting Material (Solution ≡ 23 g. solute) | Added Material | Final Concentration of ethanol, vol. percent | Weight of Precipitate, mg. | L.M. Activity (rats) |
| --- | --- | --- | --- | --- |
| 125 ml | 625 ml. ETOH | 83 | | Inactive. |
| | 500 ml. ETOH | 90 | | Do. |
| | 1,250 ml. ETOH | 95 | 350 | Active at 25–50 γ/kg. |

Alternatively the product of Example 1 may be used as starting material.

EXAMPLE 3

Further purification of the 95-percent-ethanol fraction, obtained as in Example 2, may be effected by chromatography.

A cellulose powder column with a diameter of 3.3 cm. and length of 32 cm. is prepared as follows:

"Solka Floc BW 200" (the Brown Co., Berlin, N.H.) is treated in 100 g. batches with 3 l. portions of 0.1 N HCl, water and 0.1 N acetic acid. A tubular glass column of the above dimensions is filled with a slurry of 50 g. of the treated cellulose which is drained and packed by the application of positive air pressure.

A solution is made of 300 mg. of the 95-percent-ethanol precipitate (obtained as in Example 2) in 25 ml. of 0.1 N acetic acid, and adsorbed to the cellulose by passing it through the column at a flow rate of 1–1.2 ml. per minute. The column is then eluted with n-butanol: acetic acid:water::4:1:5 at the same flow rate, 10-minute fractions being collected. The active material emerges as a narrow ninhydrin-positive peak in the approximately 180–220 ml. range of eluate.

The ninhydrin-positive fractions are combined and freeze-dried. From 300 mg. starting material approximately 210 mg. of a yellow amorphous solid is obtained, active in the rat at a level of 10γ/kg.

EXAMPLE 4

In order to obtain the active principal in crystalline form, the L.M. obtained as above was rechromatographed using the same "Solka Floc" system but at a slower flow rate—0.5 ml./min.—and collecting narrower fractions—viz. at 5 minute intervals. In this manner the fraction at about 350–375 ml. of eluant gave a strong yellow coloration with ninhydrin. On evaporating this particular fraction, colorless prismatic needles were obtained, which were once recrystallized from ethanol-water. This fraction exhibited maximum L.M. activity in the rat.

This fraction traveled as a single spot in paper chromatography in descending technique in butanol:acetic acid: water::4:1:5. In electrophoresis this fraction also traveled as a single spot towards the anode. The buffer system was formic acid:acetic acid:1:1, pH 1.9.

Hydrolysis of this product with 6 N HCl at 100° C. for 15 hours yielded a number of different amino acids— of which alanine, glycine, leucine, glutamic acid and lysine could be identified; these were separated and qualitatively identified by paper chromatography.

The activity in the rat is determined as follows:

Male and female rats of the Wistar strain were used for all tests. Rats were fasted for 18 hours prior to use in assay. Material to be tested was prepared in physiological salt solution. The animals were injected with the compound via the recurrent saphenous vein. Two hours later the rats were anesthetized with ether, the chest opened and a sample of blood obtained from the left ventricle. The blood was diluted 1:9 with 0.1 M Na citrate and then centrifuged at 5° C. until separation of plasma occurred. The optical density of the plasma was measured in a Beckman Model B spectrophotometer at 6500 A. Total blood cholesterol levels were measured by a modification of the method of Bloor (Proc. Soc. Exp. Biol. and Med., 1953, v. 83, 468–473). The hyperlipemia produced by the administration of effective amounts of L.M. is indicated by a sharp increase in the optical density of the plasma in comparison with the controls.

I claim:

1. The method of purifying the lipid mobilizer contained in the dialyzate of blood plasma obtained from the blood of non-specifically stressed mammals by dialysis against water in the absence of an organic solvent which comprises: adding to an aqueous solution of the dialyzed solute at a pH of 3.5–4.0 in successive portions a water-soluble lower-aliphatic alcohol, removing the precipitate formed on each addition of alcohol, biologically testing for enhanced lipid-mobilizing activity a sample of each precipitate, and recovering the precipitate showing such enhanced activity.

2. In combination with the method of claim 1 the additional steps of further purifying the precipitate obtained in 95-percent-by-volume ethanol, said steps comprising: dissolving said precipitate in 0.1 N acetic acid, passing the resultant solution through a column of purified acetic-acid-washed cellulose floc, then eluting the column with a slow stream of dilute aqueous butanol-acetic-acid, collecting the eluate in a plurality of separate fractions, testing each fraction for the ninhydrin reaction, and freeze-drying fractions exhibiting a yellow coloration with ninhydrin, whereby a lipid mobilizer of high potency is obtained.

3. The method of purifying the lipid mobilizer contained in the dialyzate of blood plasma obtained by dialysis against water in the absence of an organic solvent from the blood of non-specifically stressed mammals which comprises: separating solute from the dialyzate as a solid, dissolving this solid in water, adding ethanol in successive portions at a pH of 3.5–4.0 to the resulting solution up to an ethanol concentration of 90 percent by volume, removing the resulting inactive precipitates, adding additional ethanol to the residual solution up to a concentration of 95 percent by volume, and recovering the resultant precipitate, whereby a solid material is obtained having greatly enhanced potency as a lipid mobilizer.

4. The method of purifying the lipid mobilizer contained in the dialyzate of blood plasma obtained by dialysis against water in the absence of an organic solvent from the blood of non-specifically stressed mammals which comprises: separating solute from the dialyzate by adsorbing dialyzate solute to a suspended water-insoluble organic acid having the property of selectively adsorbing lipid mobilizer from an aqueous solution thereof, separating the organic acid together with adsorbate from the aqueous dialyzate, dissolving the organic acid in an organic non-solvent for the active lipid mobilizer, thereby obtaining insoluble adsorbate as a suspension, separating the insoluble adsorbate from the solution of the organic acid, dissolving the separated adsorbate in water and fractionally precipitating a product of enhanced activity by successive additions of a lower aliphatic alcohol.

5. The method defined in claim 4 in which the organic acid is benzoic acid and the organic non-solvent for the active lipid mobilizer is acetone.

6. The method of purifying the lipid mobilizer contained in the dialyzate of blood plasma obtained by dialysis against water in the absence of an organic solvent from the blood of non-specifically stressed mammals which comprises: separating solute from the dialyzate by adsorbing the weakly acidified dialyzate solute to an insoluble amorphous particulate solid having the property of selectively adsorbing lipid mobilizer from an aqueous solution thereof containing inorganic blood salts, fractionally eluting the lipid mobilizer from the adsorbent with a weakly acidified aqueous lower aliphatic alcohol, and recovering a fraction from the eluate having enhanced lipid-mobilizing activity.

7. The process according to claim 5 in which the adsorbent is selected from the class consisting of powdered cellulose floc, diatomaceous earth and cation-exchange resins.

References Cited in the file of this patent

Zarafonetis: J. Lab. and Clin. Med., December 1957, pp. 965–6.

Katzman: J. Biol. Chem., vol. 98, October-November 1932, pp. 739–753.

Pincus: The Hormones, Academic Press, N.Y., vol. 2, 1950, pp. 453–471; vol. 3, 1955, pp. 254–256, 400–425.

Seifter: P.S.E.B.M., October 1956, pp. 63–67.

Gemzell: Endocrinology, vol. 49, September 1951, pp. 325–336.

Sydnor: P.S.E.B.M., vol. 79, 1952, pp. 432–436.

Rosenberg: P.S.E.BM, vol 82, 1953, pp 701–707.

Payne: Endocrinology, vol. 45, September 1949, pp. 305–313.

Szego: Endocrinology, vol. 44, February 1949, pp. 150–165.

Heffter, A.: Handbuch der Experimentallen Pharmakologie, v. 3, Edwards Bro., Inc., Ann Arbor, Michigan, 1945, as cited in P.S.E.B.M. 91:1, January 1956, pp. 42–45.